March 27, 1951
G. F. JOHNSON
2,546,752
WORK FEEDING AND HOLDING MECHANISM
FOR MACHINE TOOLS
Filed Feb. 3, 1948
6 Sheets-Sheet 1
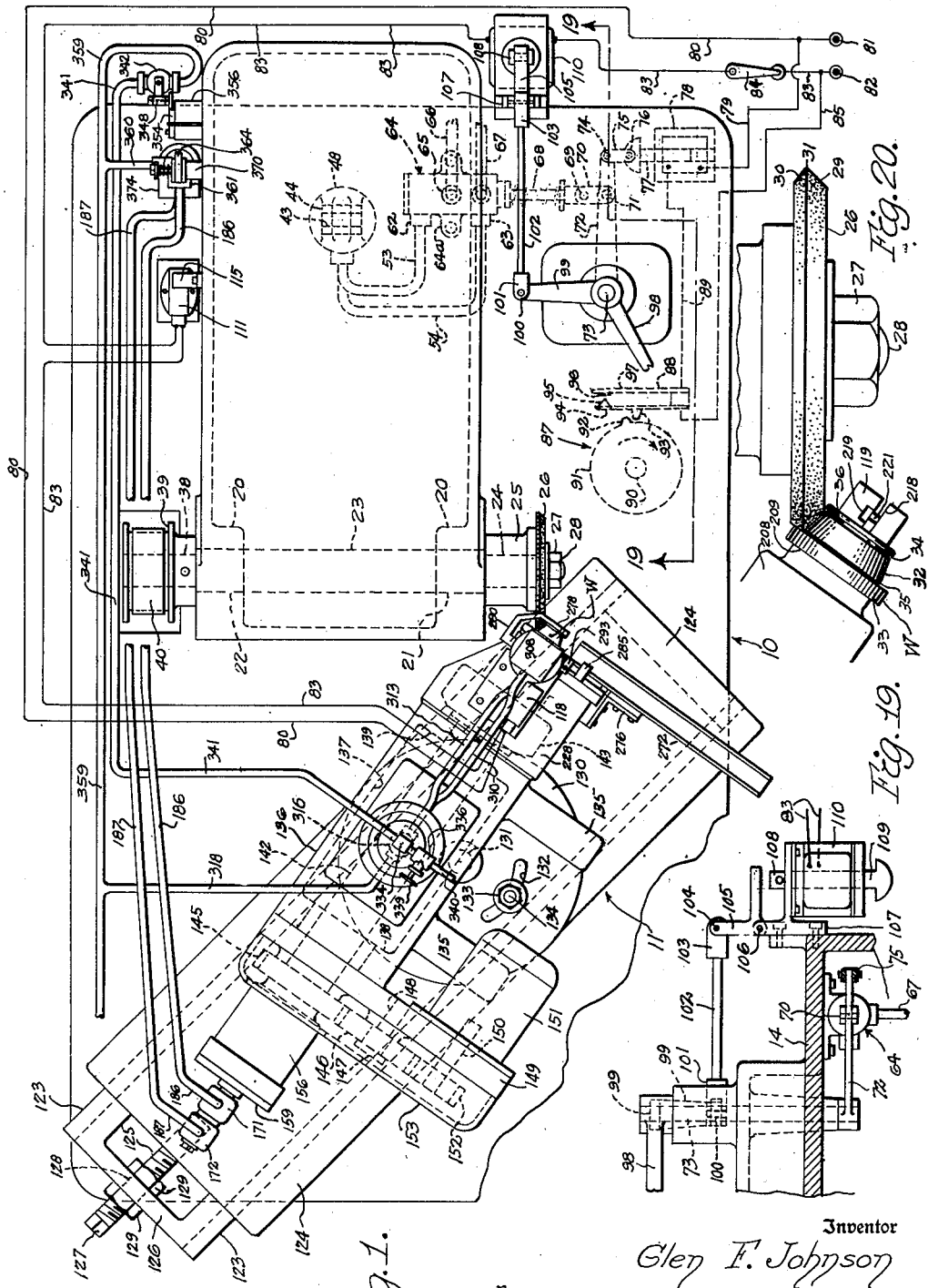
Inventor
Glen F. Johnson
Barthel + Bugbee
Attorneys

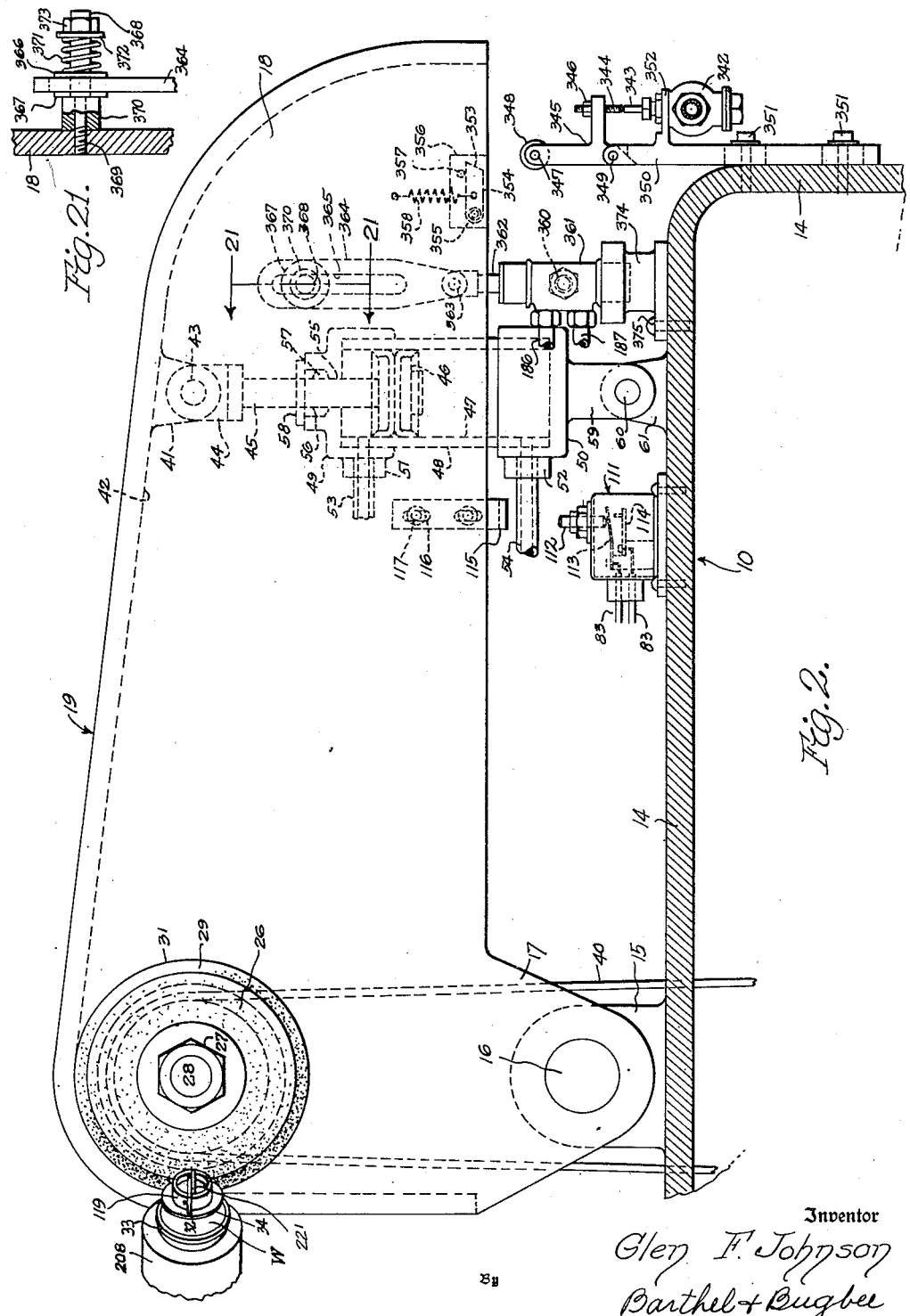

March 27, 1951
G. F. JOHNSON
2,546,752
WORK FEEDING AND HOLDING MECHANISM FOR MACHINE TOOLS
Filed Feb. 3, 1948
6 Sheets-Sheet 3
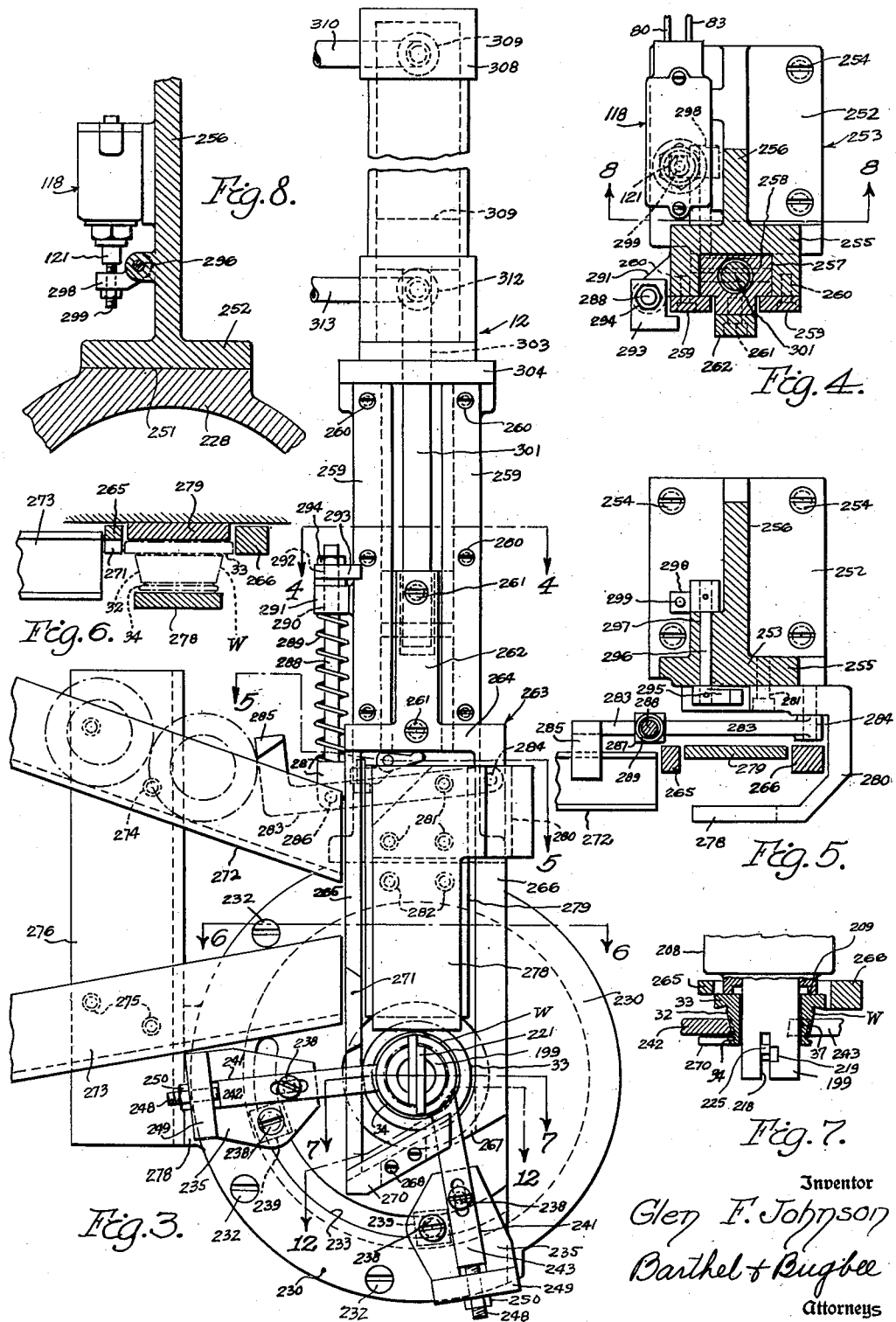
Inventor
Glen F. Johnson
Barthel & Bugbee
Attorneys

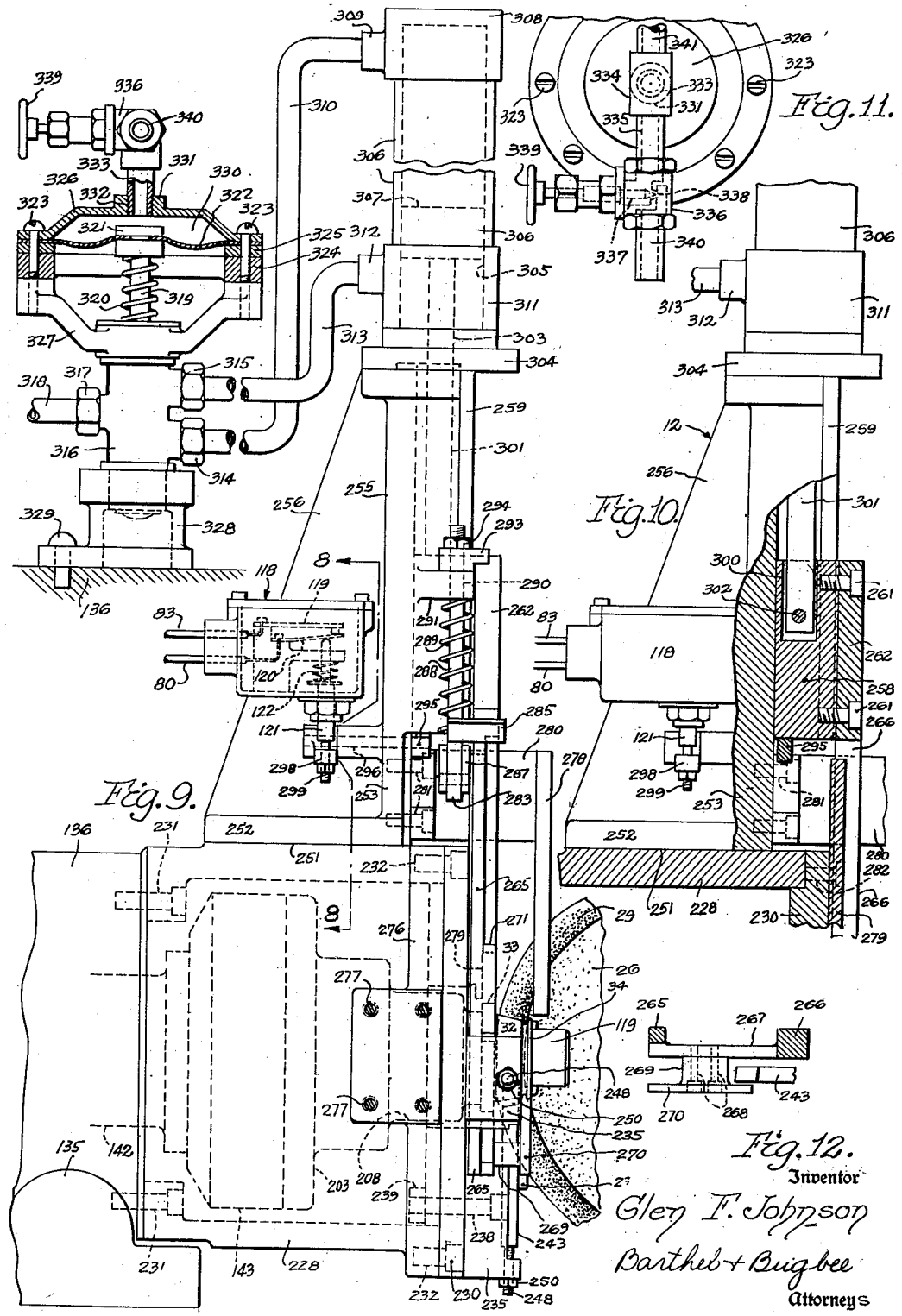

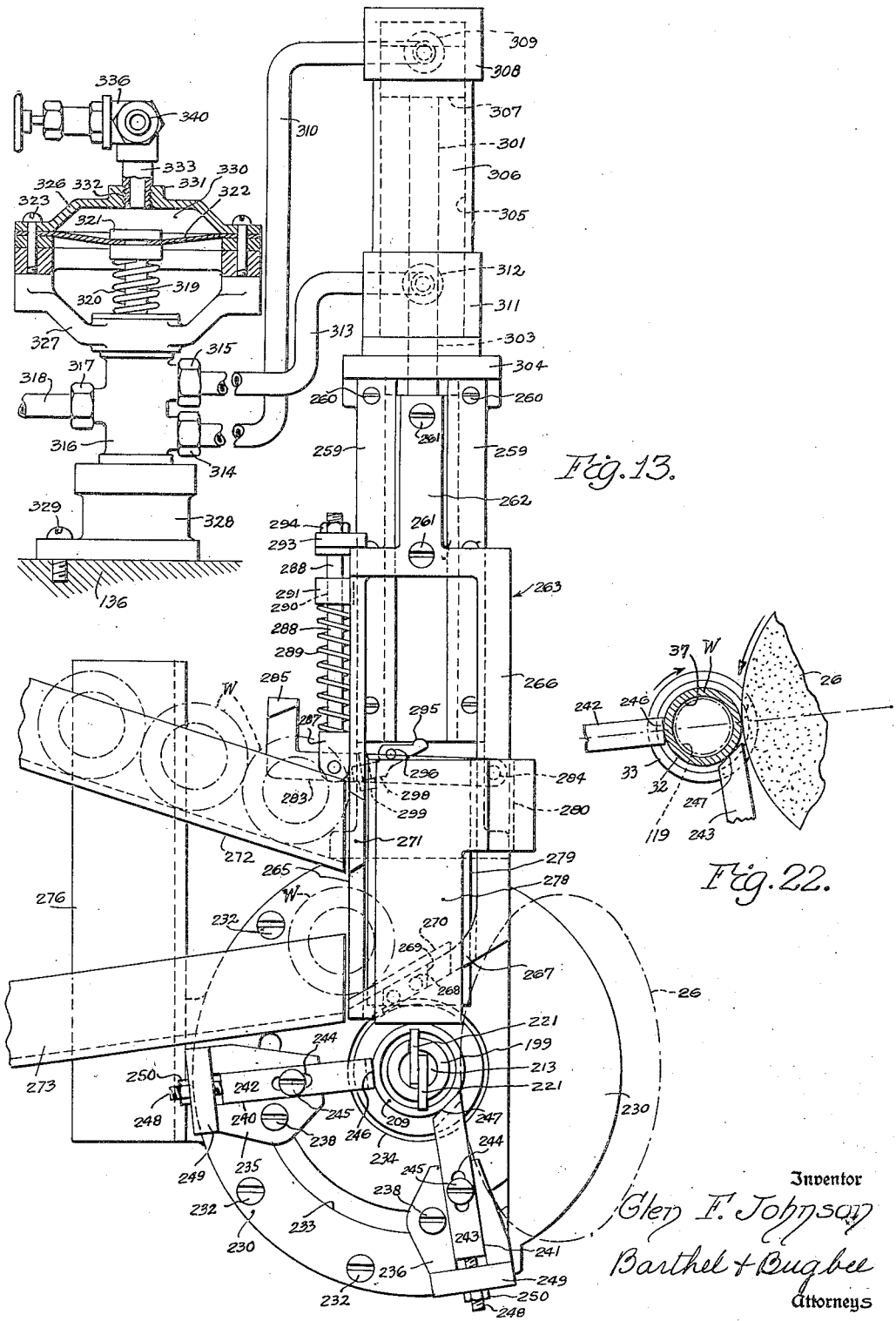

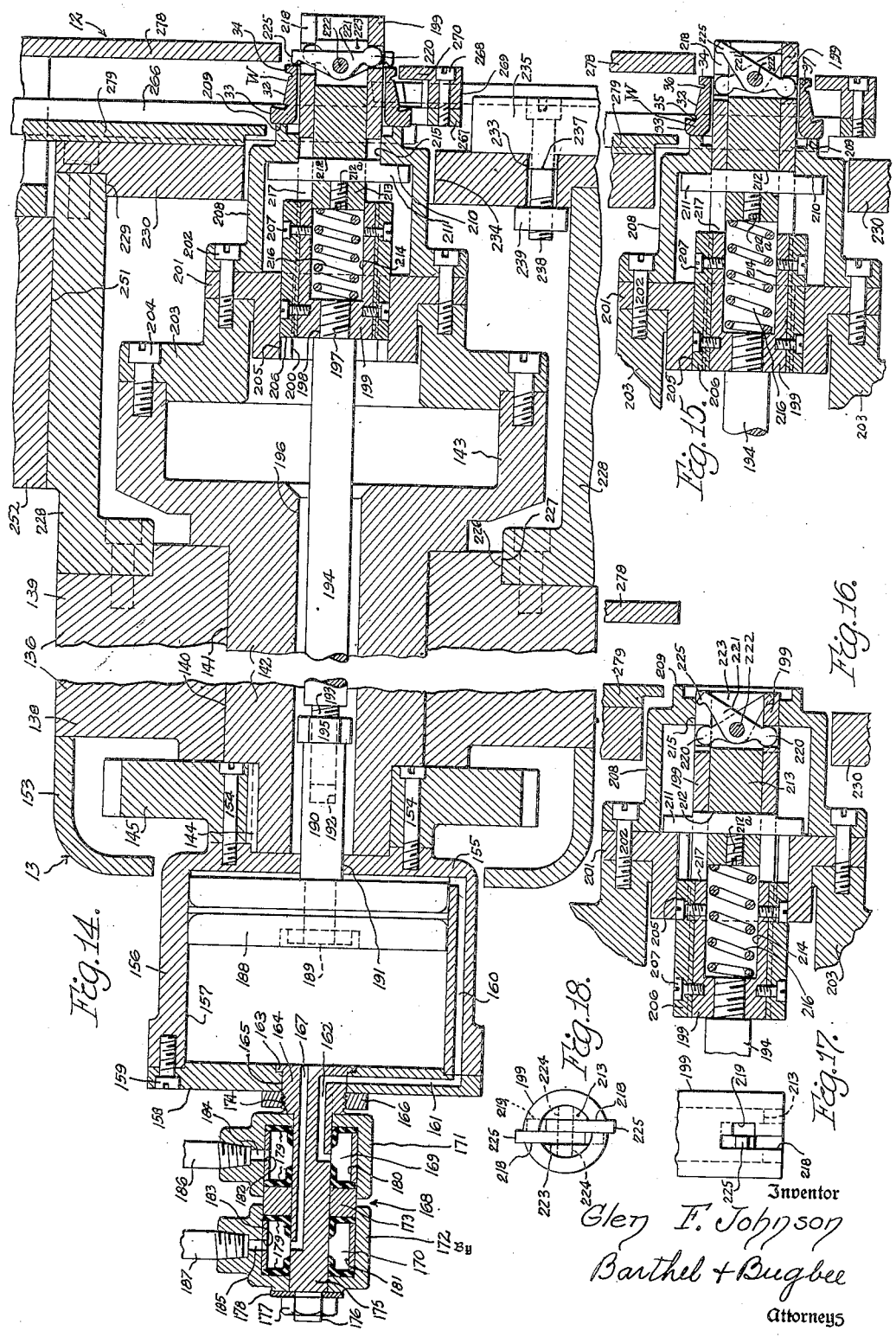

Patented Mar. 27, 1951

2,546,752

UNITED STATES PATENT OFFICE 2,546,752

WORK FEEDING AND HOLDING MECHANISM FOR MACHINE TOOLS

Glen F. Johnson, Detroit, Mich., assignor to Bower Roller Bearing Company, Detroit, Mich., a corporation of Michigan Application February 3, 1948, Serial No. 6,086

12 Claims. (Cl. 51—215)

This invention relates to grinding machines, and in particular to feeding and chucking mechanisms for centerless grinding machines.

One object of this invention is to provide an automatic feeding and chucking mechanism for feeding and holding work pieces in a centerless grinding machine, whereby the work piece, such as an anti-friction roller-bearing cone, is carried automatically through a sequence of feeding, chucking, grinding and unchucking operations which are synchronized with the operation of the grinding machine as a whole.

Another object is to provide an automatic feeding and chucking mechanism for externally grinding conical work pieces in a centerless grinder wherein the workpieces are fed automatically from a chute to a chuck which grasps them one by one long enough to subject them to the grinding operation, after which the chuck automatically releases the workpiece, whereupon the feeding device lifts the workpiece upward and deposits it in a delivery chute.

Another object is to provide an automatic feeding and chucking mechanism of the foregoing type for centerless grinding machines wherein the chucking mechanism contains automatically protracted and retracted fingers which are timed to synchronize with the operation of the grinder and feeding device in such a manner that they are retracted completely while the feeding device is depositing a workpiece in the chucking area, after which the chucking fingers are automatically protracted and brought into engagement with the workpiece so as to push it firmly against an abutment while the grinding operation is carried out, the fingers being then retracted to release the workpiece while a portion of the feeding device lifts it upward to a delivery chute.

Another object is to provide an automatic feeding and chucking mechanism of the foregoing type wherein the workpiece feeding device includes a vertically movable plunger which is engageable with a feed regulating arm successively into feed permitting and feed preventing positions, thereby regulating the delivery of workpieces to the chuck in timed relationship with the operation of the other portions of the grinding machine.

Another object is to provide an automatic feeding and chucking mechanism of the foregoing type wherein the workpiece is approximately centered by workpiece supports and is urged by the chucking mechanism against a rotary driving member or back plate while it is being ground, the driving mechanism continuing to drive the workpiece as the latter is reduced in diameter by the grinding wheel while the chucking mechanism permits the workpiece to move downward slightly while still urging it against the driving member, thus in effect floating while following the descent of the workpiece.

In the drawings:

Figure 1 is a top plan view of a centerless grinding machine equipped with an automatic feeding and chucking mechanism according to a preferred form of the present invention;

Figure 2 is a side elevation, partly in vertical section, of the tiltable grinding head and its associated mechanism shown in the upper right-hand corner of Figure 1.

Figure 3 is a front elevation of the automatic feeding and chucking mechanism shown at the left-hand side of Figure 1, with the parts in their positions at the bottom of a feeding stroke;

Figure 4 is a horizontal section along the line 4—4 in Figure 3;

Figure 5 is a horizontal section along the line 5—5 in Figure 3;

Figure 6 is a horizontal section along the line 6—6 in Figure 3;

Figure 7 is a horizontal section along the line 7—7 in Figure 3;

Figure 8 is a fragmentary vertical section along the lines 8—8 in Figures 4 and 9;

Figure 9 is a side elevation of the automatic feeding and chucking mechanism shown in Figure 3 with the workpiece supply and discharge chute omitted;

Figure 10 is a view of the central portion of Figure 9 partly in section adjacent the plunger rod;

Figure 11 is a fragmentary top plan view of the diaphragm-operated valve and needle valve for controlling the pneumatic feeding motor shown in Figure 9;

Figure 12 is an approximately horizontal section along the slightly inclined line 12—12 in Figure 3 showing the workpiece lifter;

Figure 13 is a front elevation of the automatic feeding and chucking mechanism shown in Figure 3, with the parts in their positions at the top of the ejecting stroke;

Figure 14 is an enlarged central vertical section through the workpiece chucking and rotating mechanism shown at the left-hand side of Figure 1 with the chucking fingers extending into their workpiece-engaging positions;

Figure 15 is a view similar to the right-hand portion of Figure 14, but showing the chucking fingers retracted into their tubular carrier prior to the withdrawal of the latter from the workpiece;

Figure 16 is a view similar to Figure 15, but showing the chucking finger carrier completely retracted and the workpiece completely ejected;

Figure 17 is a fragmentary top plan view of the tubular chucking finger carrier shown at the extreme right-hand side of Figure 14;

2,546,752

3

Figure 18 is a front elevation of the chucking finger carrier and fingers shown in Figure 17;

Figure 19 is a fragmentary vertical section along the line 19—19 in Figure 1, showing the solenoidally operated valve for controlling the tilting of the grinding head shown in Figure 2 and at the right-hand side of Figure 1;

Figure 20 is an enlarged fragmentary top plan view of the lower central portion of Figure 1, showing the grinding wheel engaging a conical workpiece held by the chucking device shown in Figures 14 to 18 inclusive;

Figure 21 is a fragmentary vertical section along the line 21—21 in Figure 2; and Figure 22 is a diagrammatic cross-section through the workpiece being ground, showing the positions of the workpiece-locating and positioning members.

Grinding machine construction

Referring to the drawings in detail, Figures 1 and 2 show a conventional type of centerless grinding machine generally designated 10 to which the feeding and chucking mechanism, generally designated 11, is applied. The feeding and chucking mechanism 11 in turn consists generally of a feeding device 12 (Figures 3 to 13 inclusive) and a chucking device 13 (Figures 14 to 18 inclusive). The grinding machine 10 is well known to those familiar with the centerless grinding technique and as its details form no part of the present invention, a brief description thereof will suffice.

The grinding machine 10 is supported on a hollow base or bed 14 (Figures 1 and 2). Rising from the bed 14 and integral therewith are two spaced ears or bearing bosses 15 (one only being shown in Figure 2) bored to receive a pivot shaft 16 which in turn passes through downwardly extending ears 17 forming a part of the housing 18 of the grinding head generally designated 19. The housing 18 is approximately rectangular in horizontal outline (Figure 1) and has spaced internal bosses 20 having aligned bores 21 and 22 in which a shaft 23 is journaled. The forward end of the shaft 23 is of reduced diameter as at 24 and carries thereon a hub or collar 25 against which the beveled grinding wheel 26 is clamped by means of a nut 27 on the threaded forward end 28 of the shaft 23. The threaded end 28 is further reduced in diameter from the portion 24.

The grinding wheel 26 (Figure 20) is provided with beveled portions 29 and 30 which meet in a sharp peripheral line or edge 31. The width of the portion 29 corresponds to the width of the conical portion 32 of the workpiece W which, for purposes of illustration, is shown as representing the inner race of a tapered roller bearing. The workpiece W has the usual shoulders or flanges 33 and 34 separated from the conical portion 32 by annular grooves 35 and 36 respectively. The workpiece W (Figure 15) is provided with the usual internal bore 37 by which it is mounted on the shaft which it rotatably supports, in the machinery to which it is applied. The chucking device 13 upon which the workpiece W is mounted and rotated is described below in detail.

The rearward end of the shaft 23 is provided with a reduced diameter portion 38 to which is secured a pulley 39. The pulley 39 is driven by any suitable rotating means from a prime mover (not shown) such as a motor, the belt 40 being shown as one means of rotating the pulley 39.

In order to rock the grinding head 19 so as

4 to swing the grinding wheel 26 into and out of engagement with the workpiece W, as for the purpose of inserting and removing workpieces W, the grinding head is provided with downwardly projecting spaced ears 41 (Figures 1 and 2) depending from the top wall 42 thereof. The ears 41 are bored to receive a pivot pin 43 which also passes through a block 44 connected to the upper end of a piston rod 45. The lower end of the piston rod 45 carries a piston head 46 which is reciprocable in the bore 47 of a hydraulic cylinder 48.

The cylinder 48 has upper and lower heads 49 and 50 respectively provided with bored and threaded bosses 51 and 52 into which are threaded pipes 53 and 54 respectively for conducting pressure fluid such as oil to the cylinder 48 and exhausting fluid therefrom. The upper head 49 is bored as at 55 for the passage of the piston rod 45 and counterbored as at 56 for receiving a packing 57. The latter is compressed by a tubular gland 58 through which the piston rod 45 also passes and which is threaded into the counterbore 56 to compress the packing 57 and thus prevent leakage around the piston rod 45. The lower head 50 is provided with downwardly extending spaced ears 59 (one only being shown in Figure 2) which are bored to receive a pivot shaft 60, the latter also passing through an upwardly extending ear 61 which is preferably integral with the base or bed 14. Thus, by supplying pressure fluid to the pipe 54, the piston head 46 and piston rod 45 may be moved upward to swing the head 19 around its pivot shaft 16 and cause the grinding wheel 26 to swing into and out of contact with the workpiece W, as regulated by a cam-controlled stop mechanism (not shown) which is conventional and forms no part of the present invention.

The pipes 53 and 54 (Figure 1) are connected respectively to the bored bosses 62 and 63 at the opposite end ports of a conventional four-way valve 64 which has a central bored boss 65 containing the central port and having a pressure fluid supply pipe 66 threaded therein. The valve 64 is provided with ears or lugs 64a by which it is bolted to the bed or base 14. The valve 64 is also provided with a fluid discharge pipe 67 (Figure 19) for the discharge of the fluid escaping from the opposite end of the cylinder 48 from that to which pressure fluid is admitted from the valve 64.

The four-way valve 64 (Figure 1) is provided with the usual reciprocating valve rod 68 by which the valve is operated. The valve rod 68 is pivoted as at 69 to a link 70 which in turn is pivoted at 71 to an arm 72 (Figure 19) mounted on a vertical shaft 73. At its outer end the arm 72 is pivoted as at 74 to a link 75 which in turn is pivoted as at 76 to the armature 77 of a solenoid 78 from the winding of which a wire 79 runs to an electrical supply line 80 which is connected at the terminal 81 to an external source of electric current. A terminal 82 is connected to the opposite pole of the electric current source and is in turn connected to a line 83 containing a single-pole single-throw switch 84.

Running from the line 83 (Figure 1) is a wire 85 leading to one terminal 86 of a timing device 87 of any suitable conventional type, from the opposite terminal 88 of which a wire 89 runs to the remaining terminal of the solenoid 78. The timing device 87, for purposes of illustration, is represented as consisting of an accurately timed rotating shaft 90 driven, for example, by an electrical synchronous motor (not shown). The shaft 90 carries a timing disc 91 with a peripheral projection 92 adapted to engage a similar projection 93 upon a spring arm 94. The latter carries a contact 95 adapted to engage a similar contact 96 upon an arm 97 when the arm 94 is pushed toward the arm 97 by the engagement of the projections 92 and 93 resulting from each revolution of the timing disc 91. When this occurs, the circuit energizing the solenoid 78 from the electric current supply lines 80 and 83 is closed. This action pulls inward the armature 77 and with it the arm 72 and valve rod 68, shifting the valve 64 and reversing the direction of travel of the piston rod 45 and grinding head 19, as described below in connection with the operation of the invention.

The operation of the grinding machine 10 is controlled by the shaft 73 through conventional mechanism, either by a manually operated arm 98 or by a solenoidally shifted arm 99, both arms 98 and 99 being secured to the shaft 73. Pivoted as at 100 to the outer end of the arm 99 is a clevis 101 on a link 102. The link 102 at its opposite end carries a clevis 103 which is pivoted at 104 to a bell-crank 105 pivotally mounted as at 106 upon the bracket 107 bolted to the base or bed 14 (Figure 19). The opposite arm of the bell crank 105 is engaged by the upper end 108 of the upwardly moving armature 109 of a solenoid 110, the winding of which is in series with the current supply line 83.

Also in series with the line 83 is a normally open limit switch 111 (Figures 1 and 2) which is bolted to the base or bed 14 and which has an operating plunger 112. The latter engages the spring arm 113 and forces its contact into engagement with a corresponding contact on a fixed arm 114 (Figure 2) to close the circuit in the line 83. The plunger 112 is operated by an adjustable push rod 115 which is slotted as at 116 and bolted as at 117 to the housing 18 of the grinding head 19. Thus, when the grinding head has moved backward and downward a sufficient amount to engage the push rod 115 with the switch plunger 112, the latter closes the circuit in the line 83.

Also in series with the line 83 and located at the termination of the latter is a normally open feed limit switch 118 (Figures 1, 8, 9 and 10) which is bolted to the feeding device 12, as described below. The limit switch 118 (Figure 9) is provided with a fixed arm 119 and a spring arm 120 operated by a plunger 121. The line 83 is connected to the fixed arm 119. A coil spring 122 urges the plunger 121 downward into its normally open position. Connected to the spring arm 120 is the end of the current supply line 80.

Checking mechanism

Mounted on the base or bed 14 in an oblique direction are two guide rails 123 (Figure 1) of the dovetail type upon which a dovetail slide 124 is adjustably mounted. Journaled in the rearward end of the slide 124 is a screw shaft 125 which passes through the bridge portion 126 between the guide rails 123 and is provided with a squared end 127 for the application of a wrench or crank. The screw shaft 125 passes through a threaded bore 128 in the bridge portion 126 and is locked in its adjusted position by lock nuts 129 on opposite sides thereof. The inner end of the screw shaft 125 is rotatably connected to the slide 124 on the under side thereof (not shown). By rotating the screw shaft 125, the slide 124 may be adjusted toward or away from the grinding wheel 26. The chucking device 13 is mounted upon a turntable 130 (Figure 1) which in turn is mounted upon a shaft 131 supported by the slide 124. An arcuate slot 132 and lock nut 133 threaded upon a stud 134 seated in the slide 124 serves to lock the turntable 130 in its desired position of inclination relative to the guide rails 123.

Mounted upon the turntable 130 above the strengthening ribs 135 (Figure 1) is a hollow elongated housing 136 having a hollow central portion 137 and end walls 138 and 139. The end walls 138 and 139 are provided with aligned bearing bores 140 and 141 respectively in which is journaled a tubular shaft 142 (Figure 14) having an enlarged hollow cylindrical head 143 on the forward end thereof. Keyed or otherwise drivingly secured as at 144 to the rearward end of the tubular shaft 142 is a gear 145. The latter meshes with an idler gear 146 (Figure 1) which is rotatably mounted upon a stub shaft 147, the forward end of which is journaled as at 148 in the housing extension 149 which extends laterally from the housing 136. Also journaled in the housing extension 149 is the armature shaft 150 of an electric motor 151 which is secured to the housing extension 149. The outer end of the armature shaft 150 carries a gear 152 which meshes with the idler gear 146. In this manner the tubular shaft 142 is rotated by the electric motor 151.

An elongated cover member 153 serves to enclose the gears 145, 146 and 152. Bolted as at 154 (Figure 14) to the gear 145 is the inner end wall 155 of a cylinder 156 having a cylinder bore 157 closed at one end by a cylinder head 158 secured thereto as at 159. The side wall of the cylinder 156 and the cylinder head 158 are provided with connecting passageways 160 and 161 opening into the cylinder bore 157 adjacent the end wall 155. The opposite end of the passageway 161 communicates with an approximately U-shaped passageway 162 extending through a shaft 164 which is seated in a central bore 165 in the cylinder head 158 co-axial with the axis of rotation of the cylinder 156 and tubular shaft 142. The shaft 164 on its inner end is provided with an enlarged head 163 and is held in position by a collar 166 threaded upon the shaft 164 adjacent the cylinder head 158. The shaft 164 is provided with a second longitudinal passageway 167 opening into the left-hand end of the cylinder 157.

In order to deliver compressed air or other pressure fluid either to the passageway 167 or to the connecting passageways 160, 161 and 162, the cylinder 156 is provided with a rotary air connection unit 168 (Figure 14) of which the hollow shaft 164 forms a part. The passageways 162 and 167 open into separate annular chambers 169 and 170 respectively formed in hollow annular casings 171 and 172 separated from one another by an annular member 173. The inner or forward end of the valve casing 171 is seated against a shoulder 174 formed by reducing the diameter of the shaft 164 immediately to the left of the collar 166.

The casings 171 and 172 are bored for the passage of the reduced diameter portion 175 of the shaft 164, the latter being provided with a still further reduced and threaded end portion 176 carrying a retaining nut 177 and washer 178. In this manner, the casings 171 and 172 are held stationary while the shaft 164 revolves with the cylinder 156 and the tubular shaft 142. In order to seal the shaft 164 at the places where its reduced diameter portion 175 passes through the casings 171 and 172 and the annular member 173, each chamber 169 and 170 is provided with flanged annular sealing members 179 (Figure 14) which are spaced apart from one another at opposite ends of their respective chambers by cylindrical spacers 180 and 181 having peripheral ports 182 and 183 respectively. The ports 182 and 183 open into corresponding ports 184 and 185 in the casings 171 and 172, these ports being threaded to receive the ends of air pipes 186 and 187 respectively. The connections of the opposite ends of the pipes 186 and 187 will subsequently be described.

Reciprocably mounted in the bore 157 of the cylinder 156 is a piston head 188 which is secured as at 189 to the end of a rod 190. The rod 190 passes through a bore 191 in the end wall 155 and at its opposite end is provided with an internally threaded bore 192 into which is threaded the rearward end 193 of a shaft 194 which is locked in position by a nut 195. The shaft 194 passes through a bore 196 in the center of the tubular shaft 142 and its threaded forward end 197 is threaded into a bore 198 in a sleeve 199. The sleeve 199 is reciprocably mounted in a bore 200 formed in a flanged plate 201 which is bolted as at 202 to a flanged plate 203, the latter in turn being bolted as at 204 to the hollow head 143. The flanged plate 201 is provided with axial grooves 205 which slidably receive elongated keys 206 secured by the screws 207 to the sleeve 199.

Also secured by the bolts 202 to the flanged plate 203 is a bell-shaped member 208 (Figure 14) the forward end portion of which is provided with an outer annular abutment surface 209 which serves as a back stop for the workpiece W. The forward end wall of the bell-shaped member 208 is also provided with an internal annular shoulder 210 which serves as a stop for a bar 211 which is secured by a set screw 212a in a transverse bore 212 in a plunger 213 which is reciprocably mounted in a bore 214 within the sleeve 199. The sleeve 199 in turn passes through a bore 215 in the bell-shaped member 208. A coil spring 216 constantly urges the plunger 213 and bar 211 to the right, the bar 211 passing through elongated slots 217 in the sleeve 199.

The sleeve 199 at its forward or outer end (Figure 14) is provided with inwardly extending slots 218 (Figures 14, 17 and 18). The slots 218 are offset relatively to one another (Figure 18) and are provided with pockets or alcoves 219 (Figures 17). The pockets or alcoves 219 serve to receive the rounded ends 220 of a pair of dogs 221 which are pivotally mounted in opposite directions upon a pivot pin 222 (Figures 14 to 18 inclusive). The dogs 221 are received within a slot 223 extending inward from the outer end of the plunger 213, the pivot pin 222 passing through the slot 223 (Figure 18) and being seated in aligned bores 224. The opposite ends 225 of the dogs 221 are in the form of contact fingers adapted to engage the forward edge of the workpiece W and push it rearwardly against the abutment surface 209.

*Feeding mechanism*

The feeding mechanism 12 for feeding the workpieces W to the chucking mechanism 13 is mounted upon the latter and synchronized to operate with it. For this purpose, the housing 136 adjacent the end wall 139 (Figure 14) is provided with a reduced diameter portion 226 which receives a bore 227 in an approximately hollow cylindrical housing extension 228. The forward end of the housing extension 228 is mounted upon an annular shoulder 229 of an end plate 230. The end plate 230 and housing extension 228 are secured to the housing end wall 139 by any suitable means such as bolts 231 and 232 (Figure 9). The end plate 230 is provided with an arcuate slot 233 (Figures 3, 13 and 14) concentric with the axis of the rotating sleeve 199, the end plate 230 having a bore 234 also concentric with the axis of rotation. The bell-shaped member 208 projects through the bore 234 into engagement with the workpiece W.

Mounted upon the end plate 230 in engagement with the forward face thereof are two angle blocks 235 and 236, each of which on its underside is provided with an arcuate rib 237 (Figure 14) which closely fits into the arcuate slot 233. The angle blocks 235 and 236 are bored to receive clamping bolts 238 which pass through the arcuate slot 233 and carry square nuts 239 on their threaded inner ends. Thus, the rotation of the bolts 238, such as by a screw driver, causes the angle block 235 or 236 to be either clamped tightly against the end plate 230 or released to slide in an arcuate path, guided by the engagement of its arcuate rib 237 with the arcuate slot 233. The angle blocks 235 and 236 are provided on their outer surfaces with shallow grooves 240 and 241 (Figure 13) which are directed generally toward the sleeve 199. Slidably mounted in the grooves 240 and 241 are stop bars 242 and 243 respectively, each being provided with an elongated slot 244 for adjustment relatively to a clamping screw 245. The inner end of the stop bar 242 is provided with a beveled straight end 246, whereas the stop bar 243 is provided with a beveled skew end 247, both being adapted to engage different portions of the workpiece W (Figures 13 and 22). The stop bars 242 and 246 are preferably tipped with a hard wear-resisting material, such as tungsten-carbide. In order to adjust the stop bars 242 and 243 to and fro, each of the angle blocks 235 and 236 is provided with an adjusting screw 248 (Figure 13) which is threaded through the angle portion 249 of the block and which carries a lock nut 250.

The top surface portion 251 of the housing extension 228 (Figure 14) is machined to receive the flanged base portion 252 of an upright or standard 253 (Figures 3, 9 and 13) which is secured thereto by the screws 254 (Figures 4 and 5). The standard 253 is provided with an elongated vertical guide portion 255 of approximately U-shaped cross-section and secured to the base portion 252 by the rib or web 256. The guide portion 255 of the standard 253 is provided with an elongated vertical guide groove 257 (Figure 4) in which a feed slide block 258 of T-shaped cross-section is reciprocably mounted. Retaining bars 259 are secured as at 260 to the guide portion 255 in order to hold the slide block 258 in assembly.

Secured to the slide block 258 as by the screws 261 is the upper supporting bar 262 of an approximately rectangular feed frame 263 (Figures 3 and 13) with a cross bar 264 from which parallel side members 265 and 266 extend downward and are interconnected at their lower ends by the inclined cross member 267 (Figure 12). Secured as by the screws 268 to the lower cross member 267 is a workpiece-supporting block 269 and inclined retaining member 270 which extends upward substantially parallel to the inclined cross member 267. The side member 265 is provided with an elongated forwardly extending projection 271 which serves as a gate as it reciprocates vertically with the side member 265. Cooperating with the gate 271 is a supply chute 272 and a discharge chute 273 (Figure 3), the former holding a supply of unground workpieces W and the latter carrying away the ground workpieces. The chutes 272 and 273 are secured by the fasteners 274 and 275 respectively to the vertical arm of an angle bracket 276, the horizontal arm of which is secured by the fasteners 277 to the side of the housing extension 228 (Figure 9).

In order to guide the forward and rearward edges of the workpieces W, the feeding device 12 is provided with parallel guide plates 278 and 279 extending downwardly toward the grinding position of the workpiece W upon the workpieceholding sleeve 199. The outer or forward guide plate 278 has an integral U-shaped bracket 280 (Figure 5), the rearward arm of which is secured by the fasteners 281 (Figure 10) to the standard 253. The inner guide plate 279, on the other hand, is secured by the fasteners 282 (Figures 3 and 10) to the end plate 230 of the housing extension 228. In order to retain the workpieces W in the supply chute 272 until it is desired to feed them to the feeding frame 263, an approximately L-shaped detent lever 283 is pivoted as at 284 (Figures 3 and 5) to the bracket 280, whereas the outer end thereof is provided with a horizontal finger 285 which extends across the chute 272 and, in its lowered position (Figure 3), prevents the workpieces W from descending further down the chute 272.

Pivoted as at 286 to an intermediate portion of the detent lever 283 is a clevis 287 from which rises a plunger 288 encircled by a compression coil spring 289 (Figures 3 and 9). The plunger 288 near its upper end passes through a bore 290 in a bracket 291 extending outward from the standard 253. The upper end of the plunger 288 also passes through a bore 292 in a forwardly projecting arm 293 and is adjustably held in position by a nut 294 threaded on the threaded upper end of the plunger 288. As is subsequently explained in connection with the operation of the machine, the arm 293 is engaged by the upper cross member 264 of the feeding frame 263 when the latter nears the upper limit of its stroke, as shown in Figure 13, lifting the plunger 288 and swinging the detent arm 283 upward to move the finger 285 above the workpieces W and into contact with the gate 271.

As the slide block 258 reciprocates vertically in its guideway 257, it engages a contact arm 295 (Figures 3, 5, 9 and 10) pinned to a horizontal rod 296 which is journaled in a horizontal bore 297 (Figure 5) in the standard 253. Pinned to the rearward end of the rod 296 is the hub of an arm 298 which is bored and threaded to receive an adjusting screw 299 which contacts the lower end of the switch operating plunger 121 of the limit switch 118.

The slide block 258 at its upper end is provided with a socket or cavity 300 (Figure 10) into which the lower end of a piston rod 301 is loosely received and is pivoted to the pivot pin 302 which extends to the slide block 258 and across the cavity 300. The piston rod 301 passes upward through a suitable bore 303 in the supporting plate 304 and thence into the cylinder bore 305 of a pneumatic cylinder 306 (Figure 9). Mounted on the upper end of the piston rod 301 is a piston head 307 which reciprocates in the cylinder bore 305. The upper end of the cylinder 306 is closed by an end cap 308 which has a boss 309 bored to receive the upper end of a pipe 310. The lower end of the cylinder 306 is encircled by a lower end member 311 which is provided with a boss 312, the latter being bored to receive the upper end of a pipe 313 (Figure 9).

The pipes 310 and 313 are secured at their lower ends to connections 314 and 315 of a compressed air valve 316 of a conventional type having a compressed air supply connection 317 to which is connected a compressed air supply pipe 318 (Figure 9). The valve 316 is provided with an operating plunger 319 which is encircled by a coil spring 320 and has on its upper end a head 321 which passes through a flexible diaphragm 322 and engages the opposite sides thereof. The diaphragm 322 is secured by the fasteners 323 to a supporting ring 324 by way of a spacing ring 325 and a chamber casing member 326. The supporting ring 324 is in turn supported by a spider 327 (Figure 9) the hub of which is mounted on the upper end of the valve 316. The latter is mounted upon a hollow pedestal 328 which is secured as at 329 to the housing 136.

The chamber casing member 326 is cup-shaped so as to form a closed chamber 330 above the diaphragm 322, and has a boss 331 which is bored and threaded as at 332 to receive the vertical pipe 333 which leads to a T 334 (Figure 11). From the forward end of the T 334 a pipe 335 leads to a needle valve or bleed-off valve 336 having a needle valve member 337 which is screwed in or out relatively to the valve seat 338 by the hand wheel 339 mounted on the outer end of the needle valve member 337. A pipe 340 is connected to the needle valve 336 on the opposite side thereof from the pipe 335.

From the opposite side of the T 334, a compressed air supply pipe 341 leads to the outlet port of an air valve 342 (Figures 1 and 2) of conventional construction and having a valve plunger 343 which is engaged by the lower end of an adjustment screw 344 threaded through one arm of a bell crank 345 and carrying a lock nut 346. The other arm of the bell crank 345 has a forked end carrying the axle 347 of a contact roller 348. The bell crank 345 itself is pivotally mounted upon a pivot pin 349 which is mounted upon the upper end of a bracket 350 bolted as at 351 to the bed 14. The bracket 350 is provided with an arm 352 to which the valve 342 is attached.

The roller 348 is so positioned as to be engaged by the beveled end 353 (Figure 2) of a swinging abutment arm 354 which is pivoted as at 355 to a block 356 (Figure 1) mounted on the side of the grinding head housing 18. The abutment arm 354 is urged upward against a stop pin 357 by a coil spring 358 connected at one end to the arm 354 and anchored at its opposite end to the grinding head 19. To the opposite side of the valve 342 from the connection of the pipe 341, a pipe 359 runs to a source of compressed air, such as a compressed air tank or pump. The compressed air supply pipe 359 is also connected to the branch pipe 318 which leads to the diaphragm-operated valve 316 (Figure 9).

Another branch pipe 360 leads from the compressed air supply pipe 359 to the chucking control valve 361 (Figures 1 and 2). The latter is of a conventional type and is operated by a valve plunger or stem 362 which is pivotally connected as at 363 to a link 364 with an elongated slot 365. The link 364 is frictionally engaged by spaced friction washers 366 and 367 on opposite sides thereof (Figure 21). The friction washers 366 and 367 are mounted on a stud 368 which at its rearward end is threaded into a bore 369 in the grinding head housing 18. A spacing collar 370 is arranged between the friction washer 367 and the housing 18 whereas the washer 366 is yieldingly urged against the link 364 and the latter against the washer 367 and collar 370 by a coil spring 371 which, at its opposite end, engages a washer 372 held in position by a nut 373 mounted on the outer end of the stud 368. By this arrangement, the housing 18 of the grinding head 19 can oscillate to and fro around its pivot shaft 16 (Figure 2) a much greater distance than is necessary to operate the plunger 362 of the valve 361, the link 364 and washers 366, 367 slipping relatively to one another when the valve plunger 362 has reached the end of its stroke in either direction. The pipes 186 and 187 are connected to the chucking control valve 361 which, like the feed control valve 316 (Figure 9) is mounted upon a hollow pedestal 374 secured as at 375 to the base or bed 14.

*Operation*

In the drawings, except for Figures 13, 15 and 16, the parts are shown in the positions they occupy at the instant the grinding operation is being concluded and the workpiece W is ready to be unchucked and transferred to the discharge chute while an unground workpiece is waiting to be fed to the chuck. For purposes of illustration, the workpieces W are shown (Figures 14 and 20) to be the internal cones or conical races of tapered roller bearings. These require high precision grinding on their conical surfaces on which the tapered rollers roll, and such grinding is performed by the machine equipped with the chucking and feeding devices of the present invention. Let it also be assumed that a supply of unground workpieces W has been placed in the upper or feed chute 272 (Figure 3) and that the pipe 359 has been connected to a source of compressed air.

Let it further be assumed that the electric wires 80, 83, 79 and 85 have been energized (Figure 1) by connecting their terminals 81 and 82 to a source of electricity. Let it also be assumed that the motor 151 has been energized so as to rotate the hollow shaft 142 which drives the chucking unit 13 and that the pulley 39 is being driven so as to rotate the grinding wheel shaft 23 and grinding wheel 26. Prior to the commencement of the grinding operations, it will likewise be assumed that the stop bars 242 and 243 have been so adjusted (Figures 3, 13 and 22) that the workpiece W will be supported approximately coaxial with the tubular shaft 142 and chucking sleeve 199, and also that their beveled ends 246 and 247 will properly engage the workpiece on the chuck and force it against the abutment 209 (Figure 14).

In order to start the feeding of a workpiece to the empty chucking sleeve 199, the operator shifts the hand lever 98 to actuate the valve 64 (Figures 1 and 2) and admit compressed air to the pipe 53 at the upper end of the cylinder 48. This causes the piston head 46 and piston rod 45 to move downward, swinging the grinding head housing 18 downward and rearward around its pivot shaft 16.

As the grinding head 19 moves downward (Figure 2), it shifts the valve plunger 362 of the valve 361 by reason of its frictional connection (Figure 21) with the link 364 connected to the valve plunger 362. This action shifts the valve 361 to admit compressed air from the pipe 359 into the pipe 186, whence it passes into the annular chamber 169 (Figure 14) and through the passageways 162, 161 and 160 into the right-hand end of the cylinder bore 157. The compressed air thus admitted shifts the piston head 188 to the left, carrying with it the sleeve 199 rigidly connected thereto. The pressure of the coil spring 216, however, against the plunger 214 maintains the latter in its extreme right-hand position with the cross bar 211 against the annular shoulder 210 of the bell-shaped member 208 during the initial part of the left-ward stroke of the sleeve 199.

During the initial left-ward motion of the sleeve 199, while the plunger 214 and pivot pin 222 remain temporarily stationary, the coaction of the side walls of the bores 219 in the sleeve 199 with the rounded ends 220 of the fingers 221 swings the projecting tips 225 of the fingers 221 into the sleeve 199, as shown in Figure 15. The continued motion of the sleeve 199 to the left, however, pulls the plunger 214 and cross bar 211 to the left into the interior of the bell-shaped member 208, leaving the abutment 209 completely unobstructed. The parts now occupy the positions shown in Figure 16, ready for the arrival of an unground workpiece at the grinding position in front of the annular abutment surface 209.

The grinding head housing 18 continues to move downward (Figure 2) until the beveled end 353 of the abutment arm 354 momentarily engages the roller 348 on the bell-crank 345 and swings it in a clockwise direction, forcing the valve stem 343 downward and opening the valve 342. This permits compressed air to pass through the valve 342 from the pipe 359 into the pipe 341 and thence into the chamber above the diaphragm 322. The diaphragm 322 flexes downward, pushing the valve plunger 319 downward. This causes compressed air to pass through the valve 316 from the pipes 359 and 318 to the pipe 313, admitting air beneath the piston 307 and forcing it and the feeding frame 263 upward from the position of Figure 9 to that of Figure 13.

As the frame 263 moves upward to the position of Figure 13, the left-hand end of the cross bar 264 engages and lifts the arm 293, raising the plunger 288 against the push of the spring 289 and swinging upward the detent lever 283 and its finger 285. A workpiece W is therefore permitted to roll down the chute 272, but temporarily encounters the gate portion 271 to prevent it from dropping into the feed frame 263.

Meanwhile, the detent arm 354, having passed by the roller 348, permits the bell-crank 345 to swing upward to its original position under the influence of a coil spring (not shown) within the valve 342 and engaging and urging the valve stem 343 upward. This action cuts off the further delivery of compressed air from the pipe 359 to the pipe 341. Impelled by the coil spring 320 (Figure 13), the diaphragm 322 moves slowly upward as the compressed air escapes from the chamber 330 through the needle valve 336 and pipe 340 (Figure 11). This mechanism thus acts as a dash pot to impart a time delay or dwell to the upward motion of the valve plunger 319 of the valve 316.

The upward motion of the valve plunger 319 shifts the valve 315 and causes compressed air to be admitted to the pipe 310 (Figure 9), shifting the piston head 307, piston rod 301 and slide block 253 downward (Figure 10). This action moves the feed frame 263 downward from the position of Figure 13 to that of Figure 3. As the feed frame 263 moves downward, the detent lever 283 and its finger 285 move downward behind the foremost workpiece W (Figure 13), preventing the second and subsequent workpieces from following the first workpiece in the chute 272. The downward motion of the feed frame 263 also moves the gate 271 downward, permitting the foremost workpiece W to drop from the inclined chute 272 into the vertical chute which in effect is formed between the parallel plates 279 and 278 (Figures 5, 9, 10 and 14). As the chucking sleeve 199 and its fingers 221 are in their retracted positions at this time (Figure 16), the feed frame 263 moves downward uninterruptedly until the workpiece W, which has been resting upon the portions 267 and 269 (Figure 12), comes to rest upon the ends 246 and 247 of the stop bars 242 and 243. The beveled ends 246 and 247 tend to urge the workpiece W against the annular abutment surface 209 and support the workpiece against the pressure exerted thereon by the grinding wheel.

Meanwhile, the continued downward motion of the grinding head housing 18 (Figure 2) causes the friction connection 366, 367 to slip loosely along the slot 365 in the link 364 after the valve plunger 362 has reached its lowest position. When the grinding head housing 18 reaches its lowermost position, the push rod 115 on the housing 18 (Figure 2) engages the switch plunger 112 of the limit switch 111 and closes the circuit through this normally open switch. During the same period, the downward motion of the feed frame 263 has caused the slide block 258 to engage and push downward the rounded end of the contact arm 295, rotating the rod 296 (Figure 5) and swinging the arm 298 to push the operating plunger 121 of the limit switch 118 upward, closing the circuit through this switch. As the limit switches 111 and 118 are in series with one another, the solenoid 110 becomes energized from the electric wires 89 and 83, assuming of course that the manual switch 84 is closed (Figure 1).

The energization of the solenoid 110 causes its armature 109 to be shifted upward, its top 108 engaging and shifting the bell crank lever 105 (Figure 19) to the left around its pivot 106. This swings the arm 99, shaft 73 and arm 72 in a counterclockwise direction, shifting the valve plunger 68 of the valve 64 inward. This action reverses the flow of pressure fluid to the cylinder 48, causing it to enter by the pipe 54 beneath the piston head 46. The pressure fluid causes the piston rod 45 to move upward, swinging the grinding head 19 upward and causing the grinding wheel 26 to be swung into contact with the workpiece W.

While this is occurring, the upward motion of the grinding head housing 18 through its frictional connection 366, 367 (Figure 21) with the link 364 lifts the latter and with it, the valve plunger 362 (Figure 2), shifting the chucking control valve 361. Compressed air now passes from the pipes 359 and 360 into the pipe 187 (Figure 10), thence into the chamber 178 (Figure 14) from which it proceeds through the passageway 167 into the left-hand end of the cylinder bore 157. This causes the piston head 188 and piston rods 190 and 194 to move to the right, projecting the chucking sleeve 199 through the bore 215 (Figure 15) and likewise through the bore in the workpiece W.

When the cross bar 211 reaches the annular shoulder 210 within the bell-shaped member 208, it and the plunger 213 come to a halt. Since the piston rod 194 and sleeve 199 are still moving to the right (Figures 15 and 16), the engagement of the walls of the holes 219 with the rounded ends 220 of the fingers 221 causes these to swing in a counterclockwise direction, bringing their ends 225 into engagement with the end of the workpiece W and forcing it against the annular abutment surface 209 while the coil spring 216 is being compressed. The workpiece W is now clamped in position against the annular abutment surface 209, and slides on this surface while remaining in contact with the stop bars 242 and 243.

The rotation of the tubular shaft 142 by the electric motor 151 (Figure 1) through the gear train 152, 146 and 145 causes the sleeve 199 and workpiece W to be rotated while the grinding wheel 26 is swung into contact with it. As the grinding wheel 26 engages the workpiece W, the timing device 87 operates to regulate the duration of the grinding period. When the timing device 87 shifts the switch member 86 so that the contact 95 engages the contact 96, the energization circuit of the solenoid 78 is thereby closed. This causes the armature 77 to be drawn into the solenoid 78, swinging the arm 72, shaft 73 and arm 99 clockwise, and pulling the valve plunger 68 outward away from the valve 64. This action again reverses the flow of pressure fluid to the grinding head cylinder 48 at the instant the parts are in the positions shown in Figures 1, 2, 3, 9 and 10.

By the reversal of the valve 64 just described, pressure fluid is admitted to the pipe 53 at the upper end of the cylinder 48, urging the piston head 46, piston rod 45 and grinding head housing 18 downward around the pivot shaft 16. The foregoing cycle of operations is then repeated as described above, except that the operator no longer needs to touch the handlever 98 to actuate the valve 64. Furthermore, since there is a workpiece on the sleeve 199, the retraction thereof with its fingers 221 from the position of Figure 14 to the position of Figure 16 leaves the ground workpiece W resting upon the ends of the stop bars 242 and 243 with the feed frame members 267, 269 and 270 beneath the workpiece W in the position shown in Figure 3. The subsequent upward motion of the feed frame 263 lifts the ground workpiece W upward until it reaches the chute 273 in the position shown in Figure 13, whereupon the ground workpiece W is dumped upon the chute 273 and rolls downward along it into a suitable receptacle. The foregoing operations then repeat themselves automatically as long as the workpieces W are supplied to the chute 272 and as long as the machine is supplied with pressure fluid, compressed air and electricity.

What I claim is:

1. A workpiece holding apparatus for a centerless grinding machine, comprising a support mounted on said machine, a rotary workpiece abutment rotatably mounted on said support and having an opening therethrough and a workpiece abutment portion disposed adjacent said opening, and a workpiece clamping structure rotatably mounted on said support coaxial with said abutment and having workpiece clamping mechanism retractible into said opening wholly inwardly of said abutment portion and movable axially outwardly through said opening, said mechanism including a workpiece clamping member pivotally mounted thereon and responsive to the axial outward motion thereof to swing outwardly and axially into clamping engagement with the end of the workpiece and urging the workpiece axially against said abutment portion.

2. A workpiece feeding and holding apparatus for a centerless grinding machine, comprising a support mounted on said machine, a rotary workpiece abutment rotatably mounted on said support and having an opening therethrough and a workpiece abutment portion disposed adjacent said opening, a tubular element rotatably mounted on said support coaxial with said abutment and movable axially outwardly relatively thereto through said opening, a plunger mounted within said tubular element and reciprocable relatively thereto, and workpiece clamping mechanism retractible into said opening wholly rearwardly of said abutment portion, said mechanism including a workpiece clamping member pivotally mounted on said plunger, said clamping member having one end engageable with said tubular element and responsive to the relative reciprocation between said tubular element and said plunger for swinging the other end of said clamping member outwardly and axially into clamping engagement with the end of the workpiece and urging said workpiece axially against said abutment portion.

3. A workpiece feeding and holding apparatus for a centerless grinding machine, comprising a support mounted on said machine, a rotary workpiece abutment rotatably mounted on said support and having an opening therethrough and a workpiece abutment portion disposed adjacent said opening, a tubular element rotatably mounted on said support coaxial with said abutment and movable outwardly relatively thereto through said opening, a plunger mounted within said tubular element and reciprocable relatively thereto, and workpiece clamping mechanism retractible into said opening wholly rearwardly of said abutment portion, said mechanism including a workpiece clamping member pivotally mounted on said plunger, said clamping member having one end engageable with said tubular elements and responsive to the axial motion thereof of said plunger for swinging the other end of said clamping member outwardly and axially into clamping engagement with the end of the workpiece and urging said workpiece axially against said abutment portion.

4. A workpiece feeding and holding apparatus for a centerless grinding machine, comprising a support mounted on said machine, a rotary workpiece abutment rotatably mounted on said support and having an opening therethrough and a workpiece abutment portion disposed adjacent said opening, a workpiece clamping structure rotatably mounted on said support coaxial with said abutment and having workpiece clamping mechanism retractible into said opening wholly inwardly of said abutment portion and movable axially outwardly through said opening, said mechanism including a workpiece clamping member pivotally mounted thereon and swingable outwardly and axially into clamping engagement with the end of the workpiece to urge the workpiece axially against said abutment portion, and workpiece feeding mechanism operable in timed relationship with the reciprocation of said clamping structure to feed a workpiece adjacent said abutment portion in response to the retraction of said clamping structure relatively to said abutment portion.

5. A workpiece feeding and holding apparatus for a centerless grinding machine, comprising a support mounted on said machine, a rotary workpiece abutment rotatably mounted on said support and having an opening therethrough and a workpiece abutment portion disposed adjacent said opening, and a workpiece clamping structure rotatably mounted on said support coaxial with said abutment and having workpiece clamping mechanism retractible into said opening wholly inwardly of said abutment portion and movable axially outwardly through said opening, said mechanism including a plurality of oppositely directed workpiece clamping members pivotally mounted thereon and with their opposite ends swingable outwardly and axially into clamping engagement with the end of the workpiece to urge the workpiece axially against said abutment portion.

6. A workpiece feeding and holding apparatus for a centerless grinding machine, comprising a support mounted on said machine, a rotary workpiece abutment rotatably mounted on said support and having an opening therethrough and a workpiece abutment portion disposed adjacent said opening, a workpiece clamping structure rotatably mounted on said support coaxial with said abutment and having workpiece clamping mechanism retractible into said opening wholly inwardly of said abutment portion and movable axially outwardly through said opening, said mechanism including a workpiece clamping member mounted thereon and extensible outwardly into clamping engagement with the workpiece against said abutment portion, a workpiece supply carrier, a vertically reciprocable workpiece feeder disposed adjacent said carrier in workpiece-receiving relationship therewith and movable between said carrier and said workpiece abutment portion, and mechanism operable in timed relationship with the motion of said clamping structure to feed an unground workpiece from said supply carrier to a position adjacent said abutment portion.

7. A workpiece feeding and holding apparatus for a centerless grinding machine, comprising a support mounted on said machine, a rotary workpiece abutment rotatably mounted on said support and having an opening therethrough, a workpiece clamping structure rotatably mounted on said support coaxial with said abutment and having a portion thereof movable axially through said opening, said structure including a workpiece clamping member mounted thereon and extensible outwardly into clamping engagement with the workpiece against said abutment, a workpiece supply carrier, a workpiece discharge carrier, a vertically reciprocable workpiece feeder disposed adjacent said carriers in workpiece receiving and discharging relationship therewith, said feeder being movable between said carriers and said workpiece abutment, and mechanism operable in timed relationship with the motion of said clamping structure alternately to convey a ground workpiece from said abutment to said discharge carrier and to convey an unground workpiece from said supply carrier to a position adjacent said abutment.

8. A workpiece feeding and holding apparatus for a centerless grinding machine, comprising a support mounted on said machine, a rotary workpiece abutment rotatably mounted on said support and having an opening therethrough, a workpiece clamping structure rotatably mounted on said support coaxial with said abutment and having a portion thereof movable axially through said opening, said structure including a workpiece clamping member mounted thereon and extensible outwardly into clamping engagement with the workpiece against said abutment, a workpiece rest disposed adjacent said abutment in workpiece-aligning relationship therewith, a workpiece supply carrier, a vertically reciprocable workpiece feeder disposed adjacent said carrier in workpiece-receiving relationship therewith and movable between said carrier and said workpiece abutment, and mechanism operable in timed relationship with the motion of said clamping structure to feed an unground workpiece from said supply carrier to said rest adjacent said abutment.

9. A workpiece feeding and holding apparatus for a centerless grinding machine, comprising a support mounted on said machine, a rotary workpiece abutment rotatably mounted on said support and having an opening therethrough, a workpiece clamping structure rotatably mounted on said support coaxial with said abutment and having a portion thereof movable axially through said opening, said structure including a workpiece clamping member mounted thereon and extensible outwardly into clamping engagement with the workpiece against said abutment, a workpiece rest disposed adjacent said abutment in workpiece-aligning relationship therewith, a workpiece supply carrier, a workpiece discharge carrier, a vertically reciprocable workpiece feeder disposed adjacent said carriers in workpiece receiving and discharging relationship therewith, said feeder being movable between said carriers and said workpiece abutment, and mechanism operable in timed relationship with the motion of said clamping structure alternately to convey a ground workpiece from said rest to said discharge carrier and to convey an unground workpiece from said supply carrier to said rest adjacent said abutment.

10. A workpiece feeding and holding apparatus for a centerless grinding machine, comprising a support mounted on said machine, a rotary workpiece abutment rotatably mounted on said support and having an opening therethrough and a workpiece abutment portion disposed adjacent said opening, a workpiece clamping structure rotatably mounted on said support coaxial with said abutment and having workpiece clamping mechanism retractible into said opening wholly inwardly of said abutment portion and movable axially outwardly through said opening, said mechanism including a workpiece clamping member mounted thereon and extensible outwardly into clamping engagement with the workpiece against said abutment portion, a workpiece supply carrier, a vertically reciprocable workpiece feeder disposed adjacent said carrier in workpiece-receiving relationship therewith and movable between said carrier and said workpiece abutment portion, a movable workpiece detent positioned adjacent the outlet of said supply carrier and movable into and out of workpiece detaining relationship therewith, and mechanism operable in timed relationship with the motion of said clamping structure to move said detent out of its workpiece-detaining position and feed an unground workpiece from said supply carrier to a position adjacent said abutment portion.

11. A workpiece feeding and holding apparatus for a centerless grinding machine, comprising a support mounted on said machine, a rotary workpiece abutment rotatably mounted on said support and having an opening therethrough, a workpiece clamping structure rotatably mounted on said support coaxial with said abutment and having a portion thereof movable axially through said opening, said structure including a workpiece clamping member mounted thereon and extensible outwardly into clamping engagement with the workpiece against said abutment, a workpiece supply carrier, a workpiece discharge carrier, a vertically reciprocable workpiece feeder disposed adjacent said carriers in workpiece receiving and discharging relationship therewith, said feeder being movable between said carriers and said workpiece abutment, a movable workpiece detent positioned adjacent the outlet of said supply carrier and movable into and out of workpiece detaining relationship therewith, and mechanism operable in timed relationship with the motion of said clamping structure to move said detent out of its workpiece-detaining position and alternately to convey a ground workpiece from said supply carrier to a position adjacent said abutment.

12. A workpiece feeding and holding apparatus for a centerless grinding machine, comprising a support mounted on said machine, a rotary workpiece abutment rotatably mounted on said support and having an opening therethrough, a workpiece clamping structure rotatably mounted on said support coaxial with said abutment and having a portion thereof movable axially through said opening, said structure including a workpiece clamping member mounted thereon and extensible outwardly into clamping engagement with the workpiece against said abutment, a workpiece supply carrier, a workpiece discharge carrier, a vertically reciprocable workpiece feeder disposed adjacent said carriers in workpiece receiving and discharging relationship therewith, said feeder being movable between said carriers and said workpiece abutment, a movable workpiece detent positioned adjacent the outlet of said supply carrier and movable into and out of workpiece detaining relationship therewith, mechanism operable in timed relationship with the motion of said clamping structure to move said detent out of its workpiece-detaining position and alternately to convey a ground workpiece from said supply carrier to a position adjacent said abutment, and a time delay device responsive to the upward motion of said feeder from said abutment to said discharge carrier into a predetermined raised position thereof to hold said feeder a predetermined time period in said raised position thereof.

GLEN F. JOHNSON.

REFERENCES CITED

The following references are of record in the file of this patent:

UNITED STATES PATENTS

| Number | Name | Date |
|---|---|---|
| 1,816,170 | Booth | July 28, 1931 |
| 1,947,957 | Lillman | Feb. 20, 1934 |
| 2,040,449 | Stevens | May 12, 1936 |
| 2,260,843 | Strong | Oct. 28, 1941 |
| 2,380,761 | Hutchinson | July 31, 1945 |